United States Patent [19]
Ginzburg et al.

[11] Patent Number: 4,680,010
[45] Date of Patent: Jul. 14, 1987

[54] RE-RADIATING HEAT SHIELD ASSEMBLY

[75] Inventors: Vladimir B. Ginzburg; Winfried F. Schmiedberg, both of Pittsburgh, Pa.

[73] Assignees: Wean United Rolling Mills, Inc.; International Rolling Mill Consultants, Inc., both of Pittsburgh, Pa.

[21] Appl. No.: 778,522

[22] Filed: Sep. 20, 1985

[51] Int. Cl.⁴ ............................................. F28F 13/00
[52] U.S. Cl. ..................................... 432/148; 432/65; 52/809; 110/340
[58] Field of Search ........................ 432/65, 148, 249; 72/200, 202; 52/809; 110/336, 338, 340

[56] References Cited

U.S. PATENT DOCUMENTS

| 2,289,354 | 7/1942 | Gardiner | 432/65 |
|---|---|---|---|
| 2,501,765 | 3/1950 | Dumbleton et al. | 432/148 |
| 3,181,486 | 5/1965 | King | 110/340 |
| 3,187,694 | 6/1965 | Crookston et al. | 110/340 |
| 3,208,412 | 9/1965 | Crookston et al. | 110/340 |
| 3,280,772 | 10/1966 | Bunklo | 110/340 |
| 3,344,648 | 10/1967 | Gray | 72/364 |
| 4,001,996 | 1/1977 | Byrd | 52/509 |
| 4,123,886 | 11/1978 | Byrd | 52/509 |
| 4,170,856 | 10/1979 | Musser | 110/340 |
| 4,343,168 | 10/1982 | Laws et al. | 72/10 |
| 4,381,634 | 5/1983 | Hounsel et al. | 52/506 |
| 4,411,621 | 10/1983 | Miller | 432/247 |
| 4,463,585 | 8/1984 | Laws et al. | 72/10 |
| 4,595,358 | 6/1986 | Ginsburg | 432/65 |

Primary Examiner—Henry C. Yuen
Attorney, Agent, or Firm—Arnold B. Silverman

[57] ABSTRACT

A thermally insulating block array is partially covered by thermal conducting sheets so as to enhance re-radiation of heat losses from a heated product in order to facilitate effective temprature control. The thermal conducting sheets preferably cover the face of the thermal insulating blocks which face the heated product and preferably cover the lateral surfaces of the blocks and portions of the rear surface to resist direct exposure of the thermal insulating block to the heated product.

5 Claims, 4 Drawing Figures

RE-RADIATING HEAT SHIELD ASSEMBLY

BACKGROUND OF THE INVENTION

1. Field Of The Invention

The present invention relates to a heat shield assembly for re-radiating heat with particular emphasis on re-radiation in a metal processing environment.

2. Description Of The Prior Art

In connection with processing of metal products at elevated temperature the effective control of temperature and heat transfer is frequently critical to achieving the desired characteristics of the emerging metal product. For example, processing of hot steel strip in rolling mills is taken through several working stages in order to achieve the sought after gauge and properties of the metal product. The desirability of maintaining end-to-end temperature differential in the strip during rolling in the finishing train has been recognized.

As the leading end of the strip is fed into the first stand of the finishing train, the trailing end is exposed to the atmosphere and is allowed to radiate more heat than the leading end. Further, in some instances the strip is held on a delay table which also permits heat loss from the strip.

It has been known to employ metal reflectors or heat insulating panels along a delay table of a finishing mill in order to reduce heat losses from a hot product. Such approaches have not been fully effective.

U.S. Pat. No. 4,463,585 discloses a heat shield for a rolling mill wherein a heat insulating core cooperates with a flat cover plate. The plate is adapted to be exposed to the heated product and insulation is positioned therebehind.

In spite of the foregoing knowledge, there remains a need for an improved re-radiating heat sheild for use in connection with processing of metals such as by rolling mill, for example.

SUMMARY OF THE INVENTION

The present invention has provided an effective heat shield assembly for re-radiating of heat in connection with processing of metal products at elevated temperatures.

An array of thermal insulating blocks are disposed generally in side-by-side adjacency and have a pair of faces and a connecting lateral surface. A plurality of thermal conducting sheets have a first portion covering one face of the thermal insulating blocks and a second portion covering the lateral surfaces thereof. In a preferred form, the thermal conducting sheets cover at least a portion of the opposite face of the thermal insulating blocks. Additional arrays of thermal insulating blocks may be positioned behind the first array of thermal insulating blocks.

In this manner, the thermal insulating material is not exposed directly to the heated product and the thermal insulating block and thermal conducting sheets cooperate to re-radiate heat to the product.

A plurality of heat shield arrays may be employed in such a manner as to define a tunnel for the passage of the heated product therethrough.

It is an object of the present invention to provide a re-radiating heat shield assembly wherein re-radiation of heat emerging from the heated product serves to maintain the product at the desired temperature.

It is a further object of the present invention to provide a heat shield assembly wherein the desired high heat emissivity and thermal capacity of the heat shield combined with the designed features permits rapid achieving of thermal equilibrium between the heated product and the heat shield.

It is a further object of the invention to provide coaction between the thermal insulating blocks and thermal conducting sheets so as to enhance re-radiating characteristics of the thermal conducting material.

These and other objects of the invention will be more fully understood from the following description of the invention, on reference to the illustrations appended hereto.

DESCRIPTION OF THE PREFERRED EMBODIMENT

Figure 1:
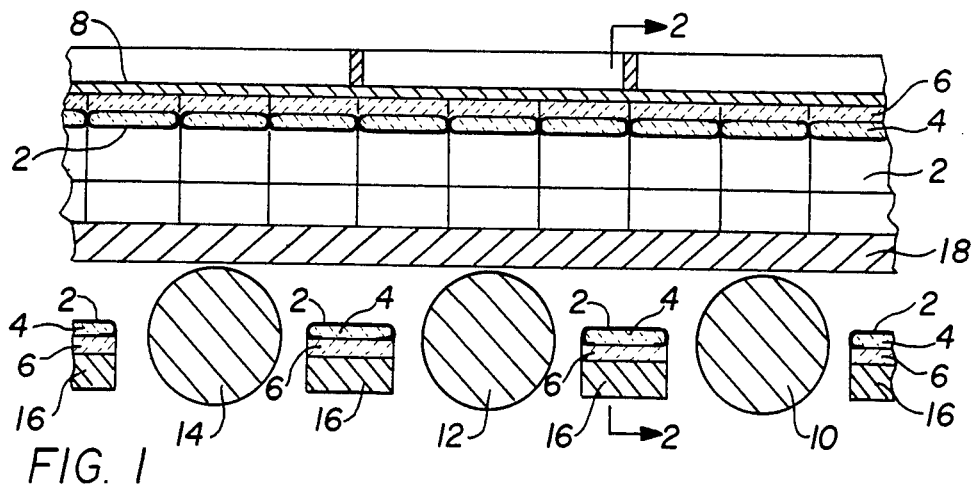
FIG. 1 is a partially schematic, fragmentary illustration of an installation employing a form of heat shield assembly of the present invention.
Figure 2:
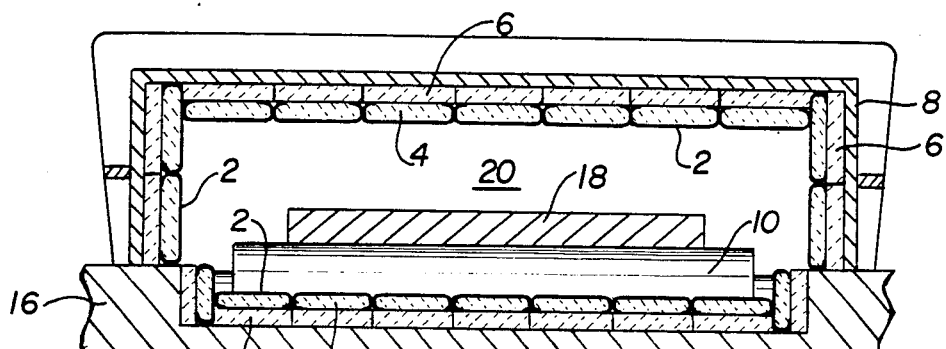
FIG. 2 is a cross-sectional illustration of the installation of FIG. 1 taken through 2—2.

Referring more specifically to FIGS. 1 and 2, there is shown a plurality of thermal conducting sheets 2 each of which is in intimate partially surrounding relationship with a thermal insulating block 4. The array of thermal insulating blocks 4 and the cooperating thermal conducting sheets 2 cooperate to resist exposure of the thermal insulating blocks 4 to direct heat eminating from the product in a manner which will be described hereinafter.

If desired, one or more additional arrays of thermal insulating blocks 6 may be provided to the exterior of thermal insulating blocks 4. Positioned to the exterior of the array of thermal insulating blocks 6 is an exterior thermally conducting frame 8 which may serve as the prime support for the rest of the heat shield assembly. The various components of the heat shield assembly may be secured to each other by any suitable means such as a suitable adhesive or mechanical fasteners, for example.

Referring still to FIGS. 1 and 2, it is seen that the elevated temperature workpiece 18 which may be a steel plate or bar, for example, is passing longitudinally through a tunnel 20 defined by the shield array. It will be appreciated that the array, in the form illustrated, provides a floor, vertical support walls and a ceiling to define tunnel open 20. Suitably supported on the floor are a series of workpiece support rolls 10,12,14 (shown with a gap for convenience of illustration).

Figure 3:
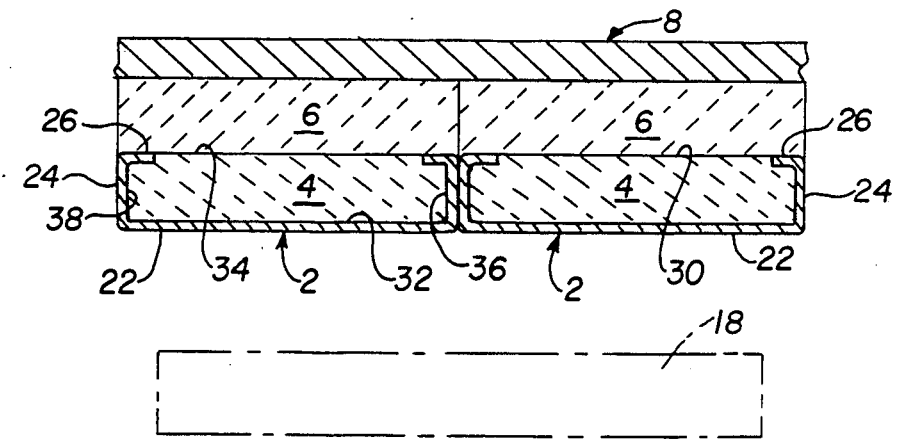
FIG. 3 is a cross-sectional illustration showing cooperating portions of the heat shield assembly of the present invention.

FIG. 3 illustrates a segment of the heat shield array. The thermal insulating blocks 4 has a first face 32, a generally parallel second face 30 or 34 and lateral faces 36,38 and a pair of additional lateral faces (not shown). The thermally conductive sheet 2 has a first portion 22 and shielding face-to-face adjacency with respect to first face 32 of thermal insulating block 4. Second portion 24 of the thermal conductive sheet 2 is in surface-to-surface shielding engagement with the four lateral surfaces of thermal insulating block 4. In the preferred form, a third portion 26 covers a portion of second face 34 of thermal insulating block 4. It will be appreciated that the heated product 18 will be positioned in spaced relationship with respect to the array. The thermal conductive sheets 2 serve to resist direct contact between the heat radiating from product 18 and the thermal insulating blocks 4,6. As the thermal conductive sheets 2 are preferably substantially continuous and preferably have first, second and third portions 22,24,26 covering the thermal insulating block 4, and the thermal insulating blocks 4 are in relatively close side-by-side adjacency, the maximum benefits in respect of re-radiating heat originating with the elevated temperature product 18 is achieved.

The thermal insulating blocks are very inefficient when it comes to stopping infrared radiation, even though they are ultra-efficient at stopping the conduction of heat. The conductive sheets 2 are, therefore, employed to absorb the heat radiated from the product 18, whereas the thermal insulating blocks 4,6 would stop the conduction of heat to the surroundings. It will be noted that as is shown in FIG. 3, second portions 24 of the thermal conductive sheets 2 are generally in surface-to-surface adjacency with adjacent second portions 24 of an adjacent sheet 2.

It is preferred that the thermally conductive sheets be composed of a ferrous material such as stainless steel, for example. It is preferred that the thermal insulating blocks 4,6 be made from any suitable thermally insulating material with refractory fibrous materials being preferred. Among the suitable refractory fibrous materials are chromia-alumina-silica, alumina-silica compositions and zirconia compositions. These materials have the properties required to withstand the high temperatures involved in such operations. For example, in a rolling mill environment the elevated temperature product 18 may have a temperature of approximately 2,000 degrees F.

It is preferred that the thermally conductive sheets 2 have a first portion 22 which has an area of about 50 to 70 percent of the second and third portions, 24,26, respectively, of the sheets 2. It is also preferred that the thermally conductive sheets 2 have a thickness of about 0.01 to 0.2 percent of the thickness of the thermally insulating blocks 4,6. For example, the first portion may be about 1 square foot in area and the sheets 2 may be about 0.002 inch thick and the blocks 4,6 about 1 to 2 inches thick.

Figure 4:
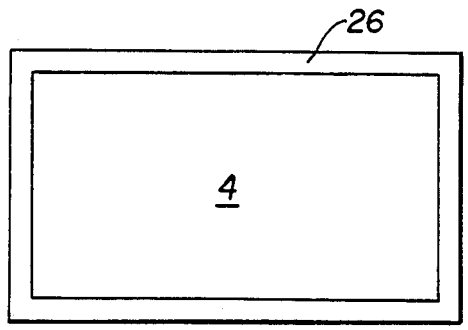
FIG. 4 is a top plan view of a single thermal insulating block and thermal conductive sheet of the present invention.

FIG. 4 shows a top plan view illustrating the third portion 26 of the thermally conductive sheets 2 in relationship to a thermal insulating block 4.

In operation, heat emitted from the elevated temperature product 18 will be received by thermal conductive sheets 2 which will absorb the heat as a result of the resistance to heat loss provided by the array of thermal insulative blocks 4,6. As soon as the temperature of the thermal conductive sheets 2 exceeds the temperature of the surrounding air, these sheets, through their emissive area or first portion 22, begin to re-radiate heat and approach thermal equilibrium with the thermally elevated product 18 rapidly. During the period of time which elapses between successive thermal elevated bars 18 passing through the tunnel 20 excessive heat stored in second and third portions 24,26, respectively, of sheets 2 will by conduction be transferred to first portion 22 thereby tending to maintain thermal equilibrium temperature in portion 22 for a longer period of time.

It will be appreciated, therefore, that the present invention has provided an efficient means for improving re-radiation heat shield for metal processing environment with particular emphasis on rolling mills. All of this is accomplished by unique interrelationships between thermal insulating blocks and thermal conductive sheets employed in the heat shield.

Whereas particular embodiments of the invention have been described above for purposes of illustration, it will be evident to those skilled in the art that numerous variations of the details may be made without departing the the invention as defined in the appended claims.

What is claimed is:

1. A heat shield assembly for re-radiating heat comprising
   an array of thermal insulating blocks disposed in generally side-by-side adjacency,
   said thermal insulating blocks having a pair of faces and an adjacent lateral surface,
   a plurality of thermal conducting sheets having first portions covering said first faces of said thermal insulating blocks and second portions covering said adjacent lateral surfaces of said thermal insulating blocks, whereby said first faces and said adjacent lateral surfaces will not be exposed directly to a heat source positioned adjacent to said array thereby reducing losses due to radiation emitted from the heat source,
   said thermal conducting sheets having third portions covering at least a portion of said second faces of said thermal insulating blocks,
   a second array of thermal insulating blocks disposed adjacent said second faces of said first array,
   said thermal conducting sheets composed of a ferrous material, and
   said first portions of said thermal conducting sheets having an area of about 50 to 70 percent of the area of said thermal conducting sheets contained within said lateral portion and said third portions thereof.

2. The heat shield assembly of claim 1 including
   said heat shield assembly disposed adjacent a tunnel for passage of an elevated temperature work piece therethrough.

3. A heat shield assembly for re-radiating heat comprising
   an array of thermal insulating blocks disposed in generally side-by-side adjacency,
   said thermal insulating blocks having a pair of faces and an adjacent lateral surface,
   a plurality of thermal conducting sheets having first portions covering said first faces of said thermal insulating blocks and second portions covering said adjacent lateral surfaces of said thermal insulating blocks, whereby said first faces and said adjacent lateral surfaces will not be exposed directly to a heat source positioned adjacent to said array thereby reducing losses due to radiation emitted from the heat source,
   said thermal conducting sheets having third portions covering at least a portion of said second faces of said thermal insulating blocks,
   a second array of thermal insulating blocks disposed adjacent said second faces of said first array,
   said thermal conducting sheets composed of a ferrous material, and
   said thermal conducting sheets having a thickness of about 0.01 to 0.2 percent of the thickness of said thermal insulating blocks.

4. The heat shield assembly of claim 2 including thermally conductive wall means disposed adjacent said second array of said thermal insulating members.

5. The heat shield assembly of claim 3 including said first portions and second portions of said thermal conducting sheets being substantially continuous, whereby a heat source passing through said tunnel will be directly exposed to said thermal conducting sheets but not directly exposed to said thermal insulating blocks.

* * * * *